United States Patent
Lee et al.

(10) Patent No.: US 7,229,199 B2
(45) Date of Patent: Jun. 12, 2007

(54) BACKLIGHT USING SURFACE-EMITTING LIGHT SOURCES

(75) Inventors: Junwon Lee, Webster, NY (US); David Kessler, Rochester, NY (US); Xiang-Dong Mi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/255,909

(22) Filed: Oct. 21, 2005

(65) Prior Publication Data

US 2007/0091613 A1   Apr. 26, 2007

(51) Int. Cl.
*F21V 5/00* (2006.01)

(52) U.S. Cl. ............... 362/561; 362/246; 362/240; 362/244

(58) Field of Classification Search ........ 362/560, 362/561, 249, 235, 236, 237, 240, 242, 244, 362/246
See application file for complete search history.

(56) References Cited

U.S. PATENT DOCUMENTS

| | | |
|---|---|---|
| 6,568,822 B2 | 5/2003 | Boyd et al. |
| 6,666,567 B1 | 12/2003 | Feldman et al. |
| 6,789,921 B1 | 9/2004 | Delroy et al. |
| 6,871,982 B2 | 3/2005 | Holman et al. |
| 2005/0145867 A1* | 7/2005 | Yau et al. ............ 257/98 |
| 2005/0201101 A1* | 9/2005 | Shimura ............... 362/330 |
| 2005/0201109 A1* | 9/2005 | Shimura ............... 362/382 |
| 2006/0012989 A1* | 1/2006 | Lee .................... 362/231 |

FOREIGN PATENT DOCUMENTS

EP    1256835    11/2002

* cited by examiner

*Primary Examiner*—Laura K. Tso
(74) *Attorney, Agent, or Firm*—Sarah M. Roberts

(57) ABSTRACT

A lighting apparatus for providing illumination, comprising:
 a) an array of surface-emitting light sources, wherein each surface-emitting light source directs a source illumination beam, over a beam angle θ, toward an illumination plane;
 b) an array of beam spreading optical elements corresponding with the array of surface-emitting light sources, wherein refraction of the source illumination beam by each beam spreading optical element substantially satisfies a distribution function:

$$dy/d\theta = f(\theta)$$

wherein y is a radial distance along the illumination plane from the optical axis of the beam-spreading optical element, dy is an arbitrarily small increment of the radial distance, dθ is the angular increment of the beam angle corresponding to dy, and
$f(\theta)$ is the distribution function for the angular distribution of the light source, such that each beam spreading optical element adjusts the luminous intensity of the source illumination beam from the corresponding surface-emitting light source to provide a uniformized illumination beam directed toward the illumination plane; and,
 c) an array of beam-divergence reducing lens elements, wherein each beam-divergence reducing lens element reduces the angular divergence of a corresponding uniformized illumination beam,
providing illumination having improved uniformity and reduced beam divergence thereby.

16 Claims, 8 Drawing Sheets

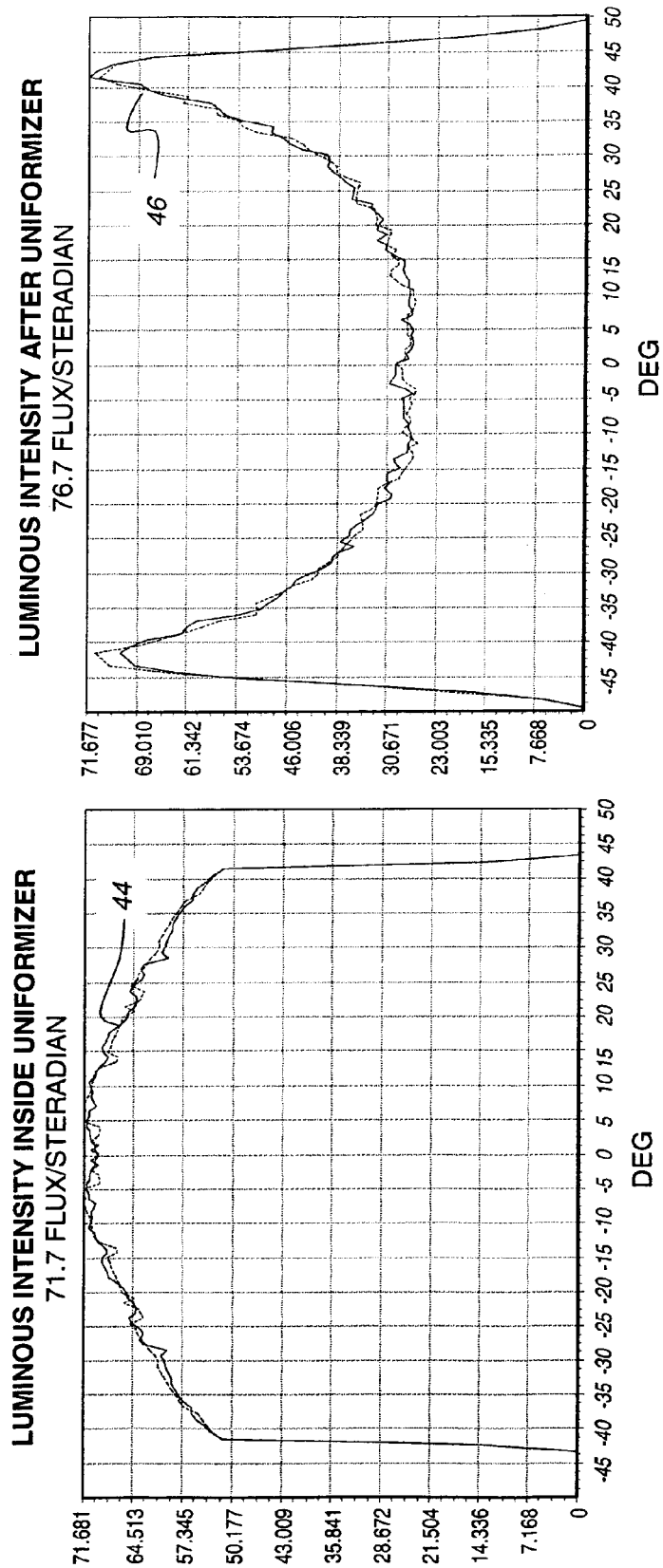

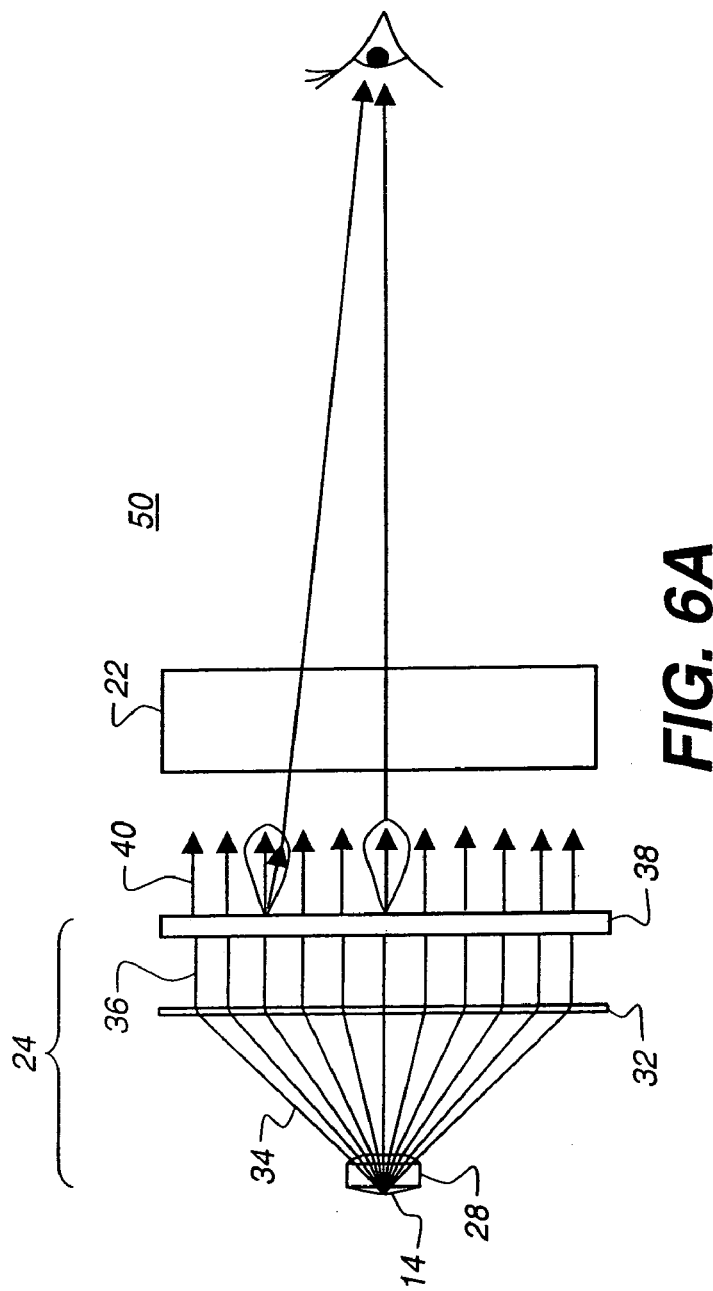

BACKLIGHT USING SURFACE-EMITTING LIGHT SOURCES

FIELD OF THE INVENTION

This invention generally relates to backlight illumination apparatus and more particularly relates to a backlight apparatus using an arrangement of light emitting diodes (LEDs).

BACKGROUND OF THE INVENTION

Transmissive Liquid Crystal Devices (LCDs) and other types of display devices require a backlight illumination source of some type. There are basically three illumination technologies in contention for the backlighting market: Electroluminescent Lamp (EL), Cold Cathode Fluorescent Lamp (CCFL), and Light Emitting Diode (LED). To date, CCFL technology has enjoyed the bulk of the laptop and portable display market, providing highly efficient and dependable light sources. CCFLs are particularly adaptable to edge-lit applications, in which these linear light sources direct light into one edge of a plate or film that spreads the light over its output surface. However, there are inherent drawbacks to CCFL technology that limit its projected growth. For example, CCFL lamps contain mercury and are somewhat fragile. CCFLs are available and are practical only in a limited range of sizes, constraining their usefulness for very small displays as well as for larger displays, such as those preferred for television viewing. Additionally, CCFLs generate unwanted heat in backlight units, potentially warping or otherwise damaging one or more of the optical film components located in the display module.

LED backlighting has inherent advantages over these other technologies. LEDs are mechanically robust, and require only low DC voltage sources. Suitable types of LEDs can be extremely bright, relatively efficient, and have inherently long life. Available in various colors, LEDs offer advantages of larger color gamut due to narrow spectral characteristics and allow easier manipulation of color. While LEDs can also be deployed in edge-lit apparatus, they also have advantages over other technologies for direct view illumination apparatus, in which an arrangement of light sources spaced apart over a surface provides the needed backlight source.

A number of direct view LED backlighting solutions have been commercialized, including the device used in the LNR460D LCD flat-screen HDTV from Samsung, for example. Patent literature describes a number of LED backlight arrangements and improvements, for example:

U.S. Pat. No. 6,789,921 entitled "Method and Apparatus for Backlighting a Dual Mode Liquid Crystal Display" to Deloy et al. describes an LED backlighting arrangement using multiple two-dimensional LED arrays including heat sink compensation;

U.S. Pat. No. 6,871,982 entitled "High-Density Illumination System" to Holman et al describes a backlight having an array of LEDs positioned within reflective housings and having supporting prismatic films;

U.S. Pat. No. 6,568,822 entitled "Linear Illumination Source" to Boyd et al. describes an illumination source for improved uniformity using LEDs, each partially enveloped within the notched input surface of a lens element;

U.S. Pat. No. 6,666,567 entitled "Methods and Apparatus for a Light Source with a Raised LED Structure" to Feldman et al. describes an LED backlight that provides added luminance by positioning LED devices above a reflective surface and providing supporting optics for spreading light from the LEDs; and, European Patent Application publication No. EP 1 256 835 entitled "Backlight for a Color LCD" by Paolini et al. describes an LED backlight arrangement wherein light from side-positioned LEDs is redirected outward by structures spaced within a light guide.

While each of the above-listed solutions promises at least some measure of improved backlighting performance using LED sources, there are drawbacks with each of these solutions and there still remains considerable room for improvement. Achieving uniformity over an area from point light sources is a complex problem and requires the interaction of multiple optical components, both for spreading the illumination over a broader area and for directing the light toward the backlit display with suitable directivity. Some combination of optical components would be required to spread and condition the point source LED illumination suitably for a backlit display.

While there has been considerable attention paid to LED backlighting devices, a number of drawbacks remain. Because LEDs act substantially as point light sources, LED direct-view backlights require high-performance diffusive elements to diffuse light over a broad surface area and recycle light where necessary. This adds to the thickness and expense of an LED backlight. Heat from the LEDs themselves can also be a problem. Hot spots from these light sources can cause uniformity aberrations in the LCD. Other illumination non-uniformities result from the overall poor light distribution of many conventional systems.

Thus, it can be seen that there would be advantages to a direct view LED backlighting apparatus that exhibits improved uniformity and efficiency, lower cost, and thinner dimensional profile.

SUMMARY OF THE INVENTION

The present invention provides a lighting apparatus for providing illumination, comprising:

a) an array of surface-emitting light sources, wherein each surface-emitting light source directs a source illumination beam, over a beam angle θ, toward an illumination plane;

b) an array of beam spreading optical elements corresponding with the array of surface-emitting light sources, wherein refraction of the source illumination beam by each beam spreading optical element substantially satisfies a distribution function:

$$\frac{dy}{d\theta} = f(\theta)$$

wherein y is a radial distance along the illumination plane from the optical axis of the beam-spreading optical element, dy is an arbitrarily small increment of the radial distance, dθ is the angular increment of the beam angle corresponding to dy, and ƒ(θ) is the distribution function for the angular distribution of the light source, such that each beam spreading optical element adjusts the luminous intensity of the source illumination beam from the corresponding surface-emitting light source to provide a uniformized illumination beam directed toward the illumination plane; and, c) an array of beam-divergence reducing lens elements, wherein each beam-divergence reducing lens element reduces the angular divergence of a corresponding uniformized illumination beam, providing illumination having improved uniformity and reduced beam divergence thereby.

It also provides a display apparatus comprising:

a) an array of surface-emitting light sources, wherein each surface-emitting light source directs a source illumination beam, over a beam angle θ, toward an illumination plane;

b) an array of beam spreading optical elements corresponding with the array of surface-emitting light sources, wherein refraction of the source illumination beam by each beam spreading optical element substantially satisfies:

$$\frac{dy}{d\theta} = f(\theta)$$

wherein y is a radial distance along the illumination plane from the optical axis, dy is an arbitrarily small increment of the radial distance, dθ is the angular increment of the beam angle corresponding to dy, and $f(\theta)$ is a function for the angular distribution of the light source, such that each beam spreading optical element adjusts the luminous intensity of the source illumination beam from the corresponding surface-emitting light source to provide a uniformized illumination beam to the illumination plane;

and, c) an array of beam-divergence reducing lens elements, wherein each beam-divergence reducing lens element reduces the angular divergence of a corresponding uniformized illumination beam, providing an illumination having improved uniformity and reduced beam divergence thereby;

d) a liquid crystal light modulator for modulating the illumination beam having reduced beam divergence to provide an image-bearing beam; and, e) a viewing angle control film, spaced apart from the liquid crystal light modulator, for broadening the viewing angle of the image-bearing beam.

It further provides a lighting apparatus for providing illumination, comprising:

a) a plurality of surface-emitting light sources, wherein each surface-emitting light source provides a source illumination beam;

b) a plurality of beam spreading optical elements, wherein each beam spreading optical element adjusts the luminous intensity of the source illumination beam from the corresponding surface-emitting light source to provide a uniformized illumination beam;

c) a plurality of beam-divergence reducing lens elements, wherein each beam-divergence reducing lens element redirects the uniformized illumination beam toward a viewing direction to provide an illumination beam having reduced angular divergence; and, d) a viewing angle control film, spaced apart from the beam-divergence reducing lens elements, for broadening the viewing angle of the illumination beam having reduced angular divergence.

It further provides a display apparatus comprising:

a) a plurality of surface-emitting light sources, wherein each surface-emitting light source provides a source illumination beam;

b) a plurality of beam spreading optical elements, wherein each beam spreading optical element adjusts the luminous intensity of the source illumination beam from the corresponding surface-emitting light source to provide a uniformized illumination beam;

c) a plurality of beam-divergence reducing lens elements, wherein each beam-divergence reducing lens element redirects the uniformized illumination beam toward a viewing direction to provide an illumination beam having reduced angular divergence;

d) a liquid crystal light modulator for modulating the illumination beam having reduced angular divergence to provide an image-bearing beam;

e) a viewing angle control film, spaced apart from the liquid crystal light modulator, for broadening the viewing angle of the image-bearing beam.

The present uses an arrangement of spaced apart LEDs or other surface-emitting light sources. It provides an LED backlight with more uniform luminance over a range of viewing angles without requiring a strong diffuser element. It also provides a backlighting apparatus that is efficient, can be made at a lower cost, and one that has a thinner dimensional profile.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 5A and 5B are graphs showing the effect of illumination beam shaping on luminous intensity;

FIG. 6A is a cross-sectional view showing how a display apparatus provides uniform spatial luminance according to the present invention;

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
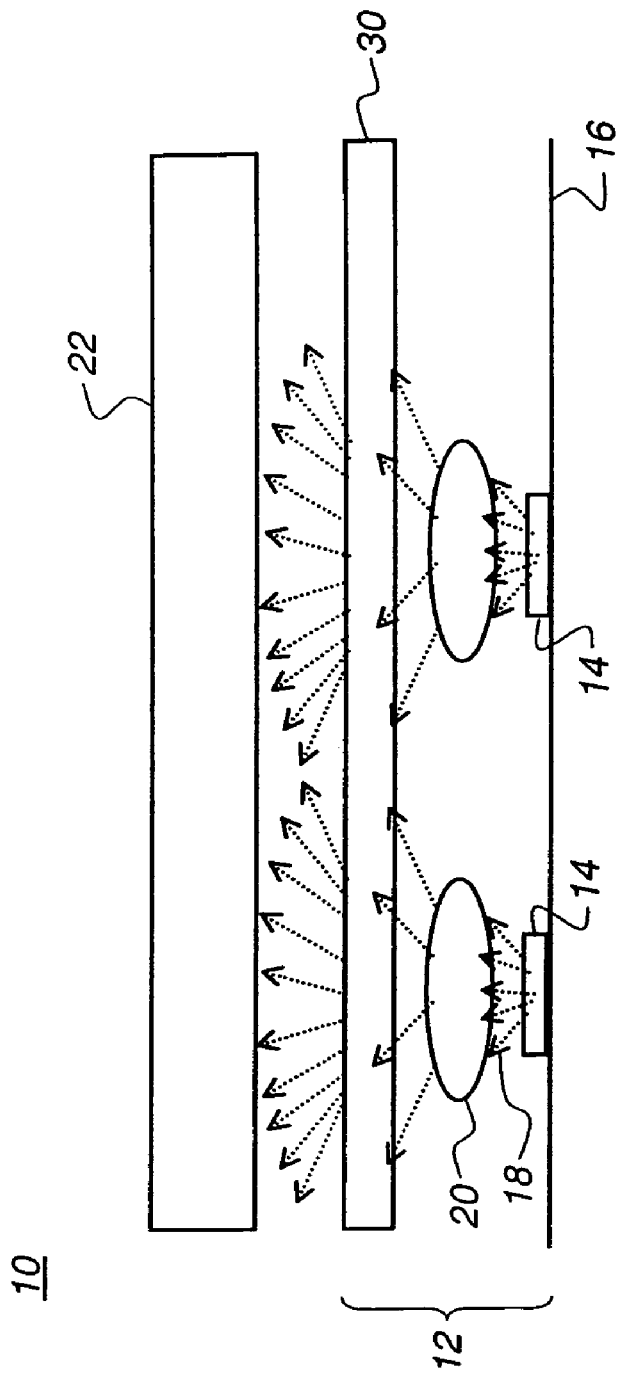
FIG. 1 is a side view in cross section of a conventional direct view LED backlight.

Referring to FIG. 1, there is shown, in simplified cross-sectional form for the sake of description, the arrangement of a portion of a conventional LCD display 10 using an LED backlight 12 to illuminate an LC device 22. A number of LEDs 14 are arranged along a surface 16, each providing a source illumination beam 18. A refractive element 20, typically a lens, spreads the source illumination beam. A diffuser 30 helps to provide further angular spread and minimize "hot spots" of higher luminance.

As a first approximation, LED 14 acts as a Lambertian source, or point source, broadcasting source illumination beam 18 over a broad range of angles. However, the spatial luminance distribution of LED 14 is generally non-uniform. Thus, refractive element 20 and diffuser 30 are needed in order to correct for the uneven luminance distribution. With the conventional arrangement of FIG. 1, diffuser 30 acts as a uniformizer. In order to compensate for the uneven luminance distribution of LED 14, diffuser 30 must be relatively thick and must be properly designed for this function. A strong diffusing element is typically needed, having a haze value greater than about 90%.

One approach that has been proposed for improving luminance uniformity is to optimize the shape of refractive element 20. For example, U.S. Pat. No. 6,568,822 entitled "Linear Illumination Source" to Boyd et al. discloses a lens having compound curved surfaces, wherein the lens is notched so that it substantially envelops an LED to spread light appropriately for backlight use. This improves the uniformity of illuminance on diffuser 30. While such a solution can help to improve illumination uniformity, it is still necessary to use a strong diffuser 30 having a high haze value in excess of 90% in order to ensure acceptable uniformity. With a haze value this high, diffuser 30 provides uniformity to the illumination by scattering light numerous times as it passes through diffuser 30 and reflects off surface 16. Significantly, there is light loss associated with each scattering and reflection. This light scattering can direct light out of the desired path and away from the end user, thus reducing the efficiency with which the light is transmitted from the light source 14 to the end user.

With the goals of improved luminance uniformity and optical efficiency in mind, the apparatus and method of the present invention further condition the illumination beam, providing a measure of beam redirection and angular reduction, before it is incident to diffuser 30. Referring to FIG. 2, there is shown, again in cross-section, an arrangement of a backlight 24 designed for improved luminance uniformity in a display apparatus 50. LEDs 14 are arranged along a reflective surface 26. Each LED 14 has a corresponding beam-spreading optical element 28 that acts as a luminance uniformizer to provide a spread illumination beam 34 over a broad range of angles. A Fresnel lens element 32, a preferred type of beam-divergence reduction lens element advantaged for its thin profile, then provides a degree of beam-divergence reduction for spread illumination beam 34, providing a reduced divergence illumination beam 36 thereby. A diffuser 38 is then provided in the path of reduced divergence illumination beam 36, as a type of viewing angle control film or article, to broaden the viewing angle and thus provide a uniformized backlight illumination 40 to LC device 22 or other component. LC device 22 modulates uniformized backlight illumination 40 to form an image modulated light beam 54.

As the term is used in the present application, a "reduced divergence" beam has at least some measure of reduced angular divergence introduced by Fresnel lens element 32. For most backlighting applications, the illumination beam need not be collimated. A divergence reduction of at least about +/−5% at a minimum would be desirable. The degree of allowable angular divergence can vary over a range, depending on the size of light source and the focal length of Fresnel lens element 32. Diffuser 38 is selected to provide a beam divergence suitable to different applications.

Optimization of the present invention is based on an analysis of luminance and illuminance. Illuminance is given in terms of luminous flux incident per unit area of a surface. Luminance, or brightness, is given in terms of luminous flux emitted from a surface per unit solid angle per projected unit area, as projected onto a plane that is normal to the propagation direction. If a light source is Lambertian, its luminous intensity has $\cos\theta$ falloff, where $\theta$ is the beam angle offset relative to normal. Its illuminance, meanwhile, has $\cos^4\theta$ falloff.

Figure 3:
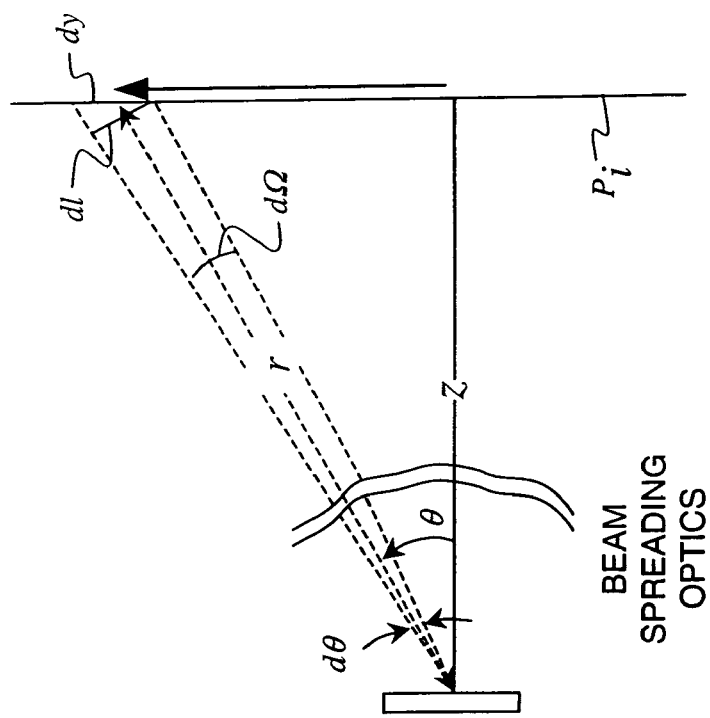
FIG. 3 is a diagram showing key geometric relationships for beam-spreading optics.

With respect to FIG. 3, the design of beam-spreading optical element 28 is intended to make the illuminance from LEDs 14 more nearly constant over a certain 2D area on an illumination plane $P_i$, which means satisfying the following equation, in as much as is possible:

$$\frac{d\Phi}{dy} = \text{constant} \qquad (1)$$

where $\Phi$ is a luminous flux and y is a distance from an optical axis on the illuminated area, as shown in FIG. 3. Line z indicates the optical axis in FIG. 3.

The luminous intensity of a Lambertian light source is expressed as a distribution function:

$$f(\theta) = \frac{d\Phi}{d\theta} = \cos(\theta) \qquad (2)$$

where $\theta$ is a measure of the angle of the beam emitted from the light source. In order to achieve uniform illuminance, it is required that beam spreading optics convert equation (2) to equation (1). Since luminous flux is conserved in any optical system, it is relatively straightforward to derive the condition that beam spreading optics should satisfy for a uniform illumination, with a Lambertian light source, as:

$$\frac{dy}{d\theta} = \cos(\theta) \qquad (3)$$

Still referring to FIG. 3, assume a beam incident on beam spreading optics with angle $\theta$. From the beam spreading optics, the beam is incident upon position y on the illumination plane $P_i$. When the incidence angle varies by an incremental amount, $d\theta$, then the corresponding variation of y, that is, dy, should be proportional to $\cos(\theta)$. In other words, the flux within the area dy increases with $\cos(\theta)$ as beam angle $\theta$ increases. Simply put, this condition requires optics that deliver more light into higher angles in order to compensate for cosine fall-off in illuminance.

One can also derive the luminous intensity of the beam after the beam spreading optics. The beam spreading optics create a uniform illuminance to satisfy the following relationship:

$$\frac{d\Phi}{dy} = const. \quad (4)$$

Where dl is a subtended area of dy, then, $$dy = \frac{dl}{\cos(\theta)}. \quad (5)$$

The subtended solid angle corresponding to dl is, then:

$$d\Omega = \frac{dl}{r^2} = \frac{dl}{\left(\frac{z}{\cos(\theta)}\right)^2} = \cos^2(\theta)\frac{dl}{z^2} \quad (6)$$

By inverting equation (6), the following is obtained:

$$dl = z^2 \frac{d\Omega}{\cos^2(\theta)}. \quad (7)$$

Substituting equation (7) into equation (4) and using equation (5) obtains:

$$\frac{d\Phi}{dy} = \frac{d\Phi}{z^2 \frac{d\Omega}{\cos^3(\theta)}} = const. \quad (8)$$

Therefore, using equation (6), the luminous intensity becomes:

$$\frac{d\Phi}{d\Omega} = const \times \frac{z^2}{\cos^3(\theta)}. \quad (9)$$

Although this derivation assumes a Lambertian light source, the same concept can be applied more generally to other types of light source. In the general case, a light source can be considered to have the angular distribution:

$$\frac{d\Phi}{d\theta} = f(\theta) \quad (10)$$

Following the same derivation procedure, equation (3) can be extended to more general form as, $$\frac{dy}{d\theta} = f(\theta). \quad (11)$$

Equation (11) is a generalized form of equation (3). Using this analysis, the goal for beam-shaping optics in an illumination system using LED sources is to satisfy equation (11) above, given a particular angular distribution function $f(\theta)$. In the example described above, angular distribution function $f(\theta)$ followed a cosine characteristic. Other possible angular distribution functions could be exponential or trigonometric functions, such as $\cos^2(\theta)$, for example. Whatever the angular distribution function $f(\theta)$, the beam-shaping optics should compensate in such a way that luminous flux at the illumination plane remains essentially uniform. Overall, the illuminance uniformity provided by the beam-shaping optics should be within ~90%.

Figure 4:
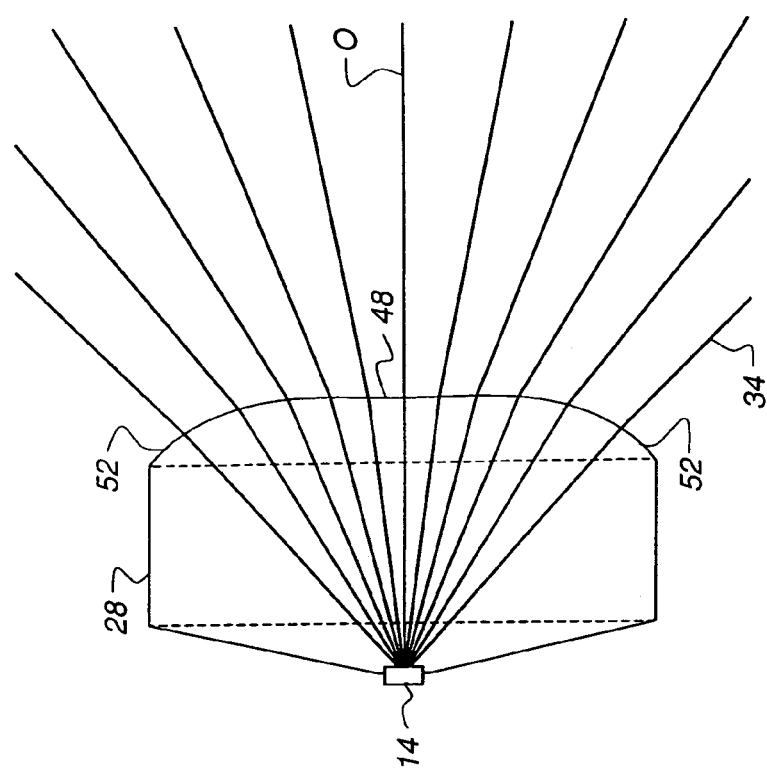
FIG. 4 is a side view of a beam spreading optical element according to an embodiment of the present invention.

FIG. 4 shows, in cross-sectional profile, the shape of beam-spreading optical element 28 in one embodiment. Here, beam-spreading optical element 28 is a lens having both concave and convex curvature. Beam-spreading optical element 28 has a concave portion 48 in the center of the lens element, that is, relatively close to the optical axis O, and convex outer portions 52. (In FIG. 4, concave portion 48 has very slightly concave curvature.)

FIG. 5A shows a graph 44 of luminous intensity of the light from LED 14 before conditioning by beam-spreading optical element 28. FIG. 5B shows a graph 46 of the luminous intensity, over a range of angles about normal (0 degrees) of spread illumination beam 34 (FIG. 2) provided from beam-spreading optical element 28. The improved shape of graph 46 shows luminous intensity proportional to $(\cos^3\theta)^{-1}$ as desired.

Figure 2:
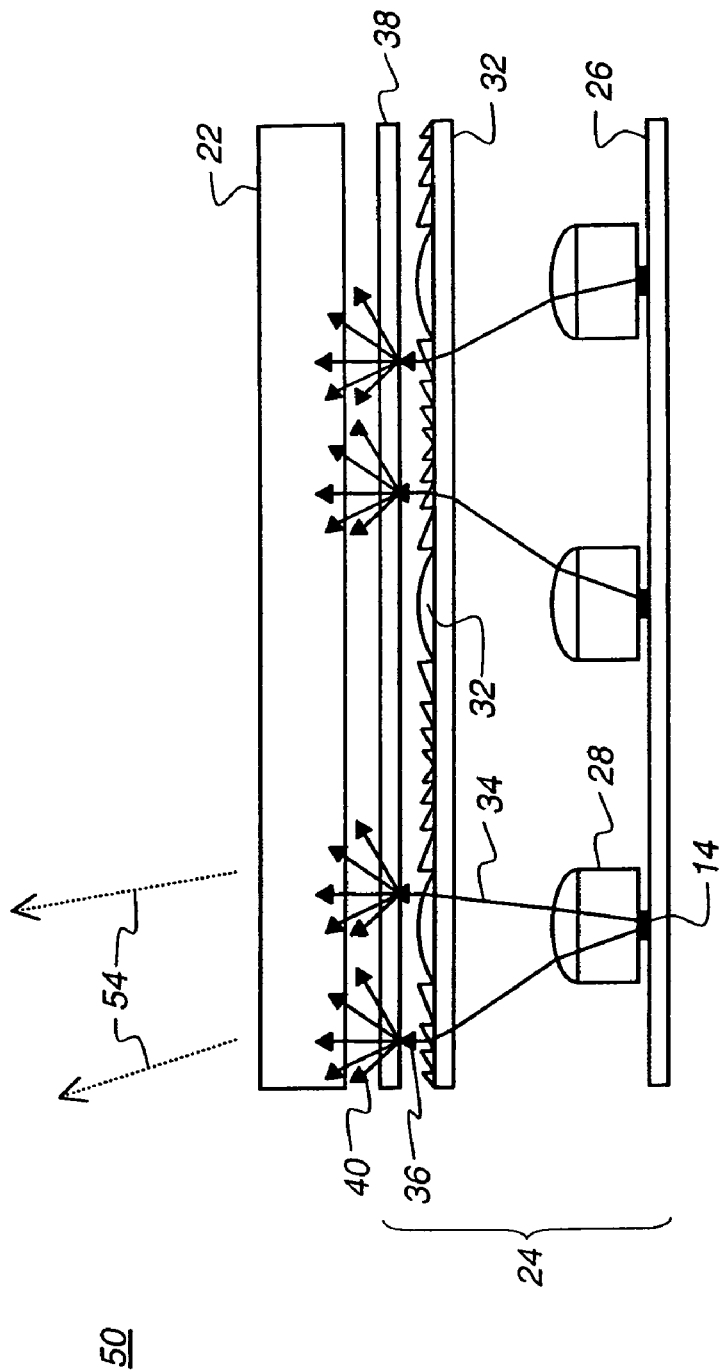
FIG. 2 is a side view in cross section of an LED backlight according to an embodiment of the present invention.

FIG. 6A shows, in idealized form, how display apparatus 50 provides spatial luminance that is essentially uniform. Here, LED 14 provides light to beam spreading optical element 28, which provides the beam spreading function described above. Fresnel lens element 32 then provides beam divergence reduction and directs the conditioned illumination to diffuser 38, typically a film, for viewing angle control. This arrangement provides a uniform spatial luminance to the illumination as it reaches LC device 22. In this system, the angular spread of light by diffuser 38 is used to broaden the view angle, rather than to provide uniformity as in conventional designs. Accordingly, the diffuser 38 is selected in a customized fashion so to meet the specific view angle requirements of the display module. In the embodiments of FIGS. 2 and 6A, diffuser 38 is in the illumination path. In an alternate embodiment, diffuser 38 could be disposed in the path of modulated light, that is, between the light modulating element and the viewer. In one embodiment, diffuser 38 increases the viewing angle for an LC display apparatus by at least about +/−10 degrees.

The apparatus and method of the present invention provide each LED 14 with a corresponding beam spreading optical element 28 and Fresnel lens element 32. Fresnel lens elements 32 for multiple LEDs 14 can be provided in an array, so that, in one embodiment, a single sheet has an array of multiple Fresnel lens elements, suitably sized and spaced apart from each other, based on the spacing of LEDs 14. Some alignment between each individual Fresnel lens element 32 and its corresponding LED 14 would be needed; however, highly precise alignment is not necessary. Diffuser 38 can be a film or plate, and can be considerably thinner than the corresponding diffusive element needed for conventional LED backlights, such as backlight 24 shown in FIG. 1.

Figure 6B:
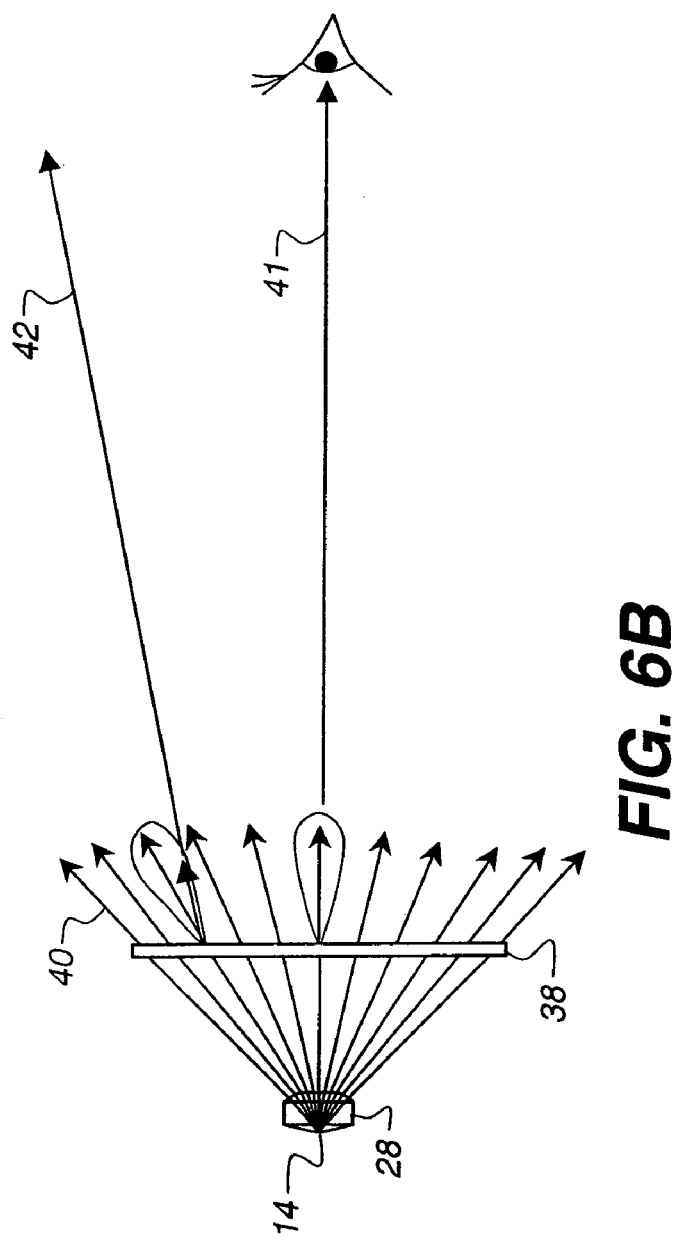
FIG. 6B is a side view in cross section showing light conditioning effects without a Fresnel lens according to the present invention or a comparative example; and, FIG. 7 is a plan view of a possible honeycomb arrangement for LED light sources and support components in one embodiment.

Without the beam-divergence reduction provided by Fresnel lens element 32, illumination sensed by the viewer may not be uniform due to the directionality of the incident beam. FIG. 6B shows this condition graphically. A light ray 41 at near normal direction is readily visible to the viewer. In comparison a light ray 42 propagates at an off-axis angle and does not propagate to the eye even after conditioning by diffuser 38. Without some beam divergence reduction, a portion of the illumination may be directed away from the desired viewing angle, resulting in significant reduction of illumination. One approach for preventing this is to use a very strong diffuser, having a haze value above 90%; however, such highly diffusive optical components exhibit high absorption and back reflection that cause low optical efficiency. In the present invention, Fresnel lens element 32 (shown in FIGS. 2 and 6A) eliminates the need for strong diffusers by beam divergence reduction, redirecting the incident beam to a more nearly normal direction regardless of incident angle. Only a weak diffuser, having a haze value below 90%, is needed in order to spread the illumination over a narrow range of angles before it reaches LC device 22.

Figure 7:
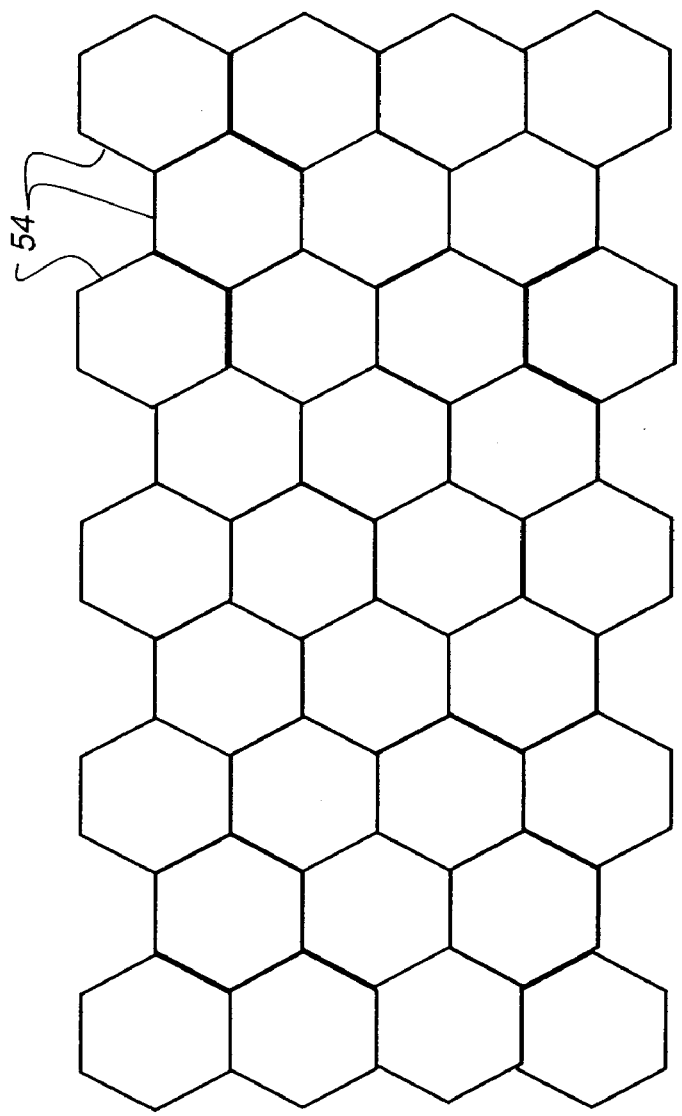

LEDs 14 and their supporting components can be arranged along reflective surface 26 in a rectangular pattern of rows and columns or in some other suitable pattern. For example, the plan view of FIG. 7 shows a honeycomb pattern, in which individual cells 54 are arranged in a compact packaging pattern. Each cell 54 would contain one LED 14 with a corresponding beam spreading optical element 28 and Fresnel lens element 32. Packaging of components in this manner, using hexagonal honeycomb cells 54, optimizes component placement within the plane of illumination provided by LEDs 14.

Fabrication

In one embodiment, beam-shaping and conditioning components used in display apparatus 50 (FIGS. 2 and 6A) are fabricated with a predetermined component spacing, so that, for example, LEDs 14 and their corresponding beam spreading optical elements 28 are uniformly spatially distributed. Fresnel lenses 32 are molded as part of a single sheet, with the individual lenses suitably spaced apart for alignment with LEDs 14.

Beam spreading optical elements 28 can be formed from conventional optical materials. When aspheric shapes are used, fabrication using optical plastics is generally preferred. Because these components are part of an illumination system (rather than of an imaging system), manufacturing tolerances need not be stringent.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, while LEDs 14 are used, other types of surface-emitting light sources could be used as point sources. A reflective beam spreading optical element 28 could also be used. LED 14 or other surface-emitting light source could be a polychromatic source, such as a white light source, or could be monochromatic. Fresnel lens element 32 is advantaged for its thin dimensions; some alternate type of thin collimating lens element could be substituted in order to provide the collimating functions of Fresnel lens element 32.

Thus, what is provided is an apparatus and method for an LED backlighting apparatus and a display using that apparatus.

PARTS LIST

| | |
|---|---|
| 10. | LCD display |
| 12. | Backlight |
| 14. | LED |
| 16. | Surface |
| 18. | Source illumination beam |
| 20. | Refractive element |
| 22. | LC device |
| 24. | Backlight |
| 26. | Reflective surface |
| 28. | Beam spreading optical element |
| 30. | Diffuser |
| 32. | Fresnel lens element |
| 34. | Spread illumination beam |
| 36. | Substantially collimated illumination beam |
| 38. | Diffuser |
| 40. | Uniformized backlight illumination |
| 41, 42. | Light ray |
| 44. | Graph |
| 46. | Graph |
| 48. | Concave portion |
| 50. | Display apparatus |
| 52. | Outer portion |
| 54. | Image modulated light beam |
| $P_i$ | Illumination plane |

The invention claimed is:

1. A lighting apparatus for providing illumination, comprising:
   a) an array of surface-emitting light sources, wherein each surface-emitting light source directs a source illumination beam, over a beam angle θ, toward an illumination plane;
   b) an array of beam spreading optical elements corresponding with the array of surface-emitting light sources, wherein refraction of the source illumination beam by each beam spreading optical element substantially satisfies a distribution function:

$$\frac{dy}{d\theta} = f(\theta)$$

wherein y is a radial distance along the illumination plane from the optical axis of the beam-spreading optical element, dy is an arbitrarily small increment of the radial distance, dθ is the angular increment of the beam angle corresponding to dy, and
   $f(\theta)$ is the distribution function for the angular distribution of the light source, such that each beam spreading optical element adjusts the luminous intensity of the source illumination beam from the corresponding surface-emitting light source to provide a uniformized illumination beam directed toward the illumination plane;
   and,
   c) an array of beam-divergence reducing lens elements, wherein each beam-divergence reducing lens element reduces the angular divergence of a corresponding uniformized illumination beam,
   providing illumination having improved uniformity and reduced beam divergence thereby.

2. A lighting apparatus for providing illumination, comprising:
   a) a plurality of surface-emitting light sources, wherein each surface-emitting light source provides a source illumination beam;

b) a plurality of beam spreading optical elements, wherein each beam spreading optical element adjusts the luminous intensity of the source illumination beam from the corresponding surface-emitting light source to provide a uniformized illumination beam;

c) a plurality of beam-divergence reducing lens elements, wherein each beam-divergence reducing lens element redirects the uniformized illumination beam toward a viewing direction to provide an illumination beam having reduced angular divergence; and, d) a viewing angle control film, spaced apart from the beam-divergence reducing lens elements, for broadening the viewing angle of the illumination beam having reduced angular divergence.

3. A display apparatus comprising:

a) a plurality of surface-emitting light sources, wherein each surface-emitting light source provides a source illumination beam;

b) a plurality of beam spreading optical elements, wherein each beam spreading optical element adjusts the luminous intensity of the source illumination beam from the corresponding surface-emitting light source to provide a uniformized illumination beam;

c) a plurality of beam-divergence reducing lens elements, wherein each beam-divergence reducing lens element redirects the uniformized illumination beam toward a viewing direction to provide an illumination beam having reduced angular divergence;

d) a liquid crystal light modulator for modulating the illumination beam having reduced angular divergence to provide an image-bearing beam;

e) a viewing angle control film, spaced apart from the liquid crystal light modulator, for broadening the viewing angle of the image-bearing beam.

4. The display apparatus of claim 3 wherein the viewing angle control film increases the viewing angle by at least about +/−10 degrees.

5. The lighting apparatus of claim 1 wherein the beam-divergence reducing lens elements are Fresnel lenses.

6. The lighting apparatus of claim 1 wherein at least one surface-emitting light source is an LED.

7. The lighting apparatus of claim 1 wherein at least one surface-emitting light source is monochromatic.

8. The lighting apparatus of claim 1 wherein at least one surface-emitting light source is polychromatic.

9. The lighting apparatus of claim 1 wherein at least one beam spreading optical element comprises an aspherical lens, wherein the lens surface facing the illumination plane comprises at least both concave curvature and convex curvature.

10. The lighting apparatus of claim 1 wherein the array of beam-divergence reducing lens elements are on a sheet of film.

11. The lighting apparatus of claim 1 wherein distribution function $-f(\theta)$ is an exponential function.

12. The lighting apparatus of claim 1 wherein distribution function $f(\theta)$ is a trigonometric function.

13. The lighting apparatus of claim 2 wherein the viewing angle control film is a diffuser having a haze value of 90% or less.

14. The lighting apparatus of claim 3 wherein the viewing angle control film is a diffuser having a haze value of 90% or less.

15. A display apparatus comprising:

a) an array of surface-emitting light sources, wherein each surface-emitting light source directs a source illumination beam, over a beam angle $\theta$, toward an illumination plane;

b) an array of beam spreading optical elements corresponding with the array of surface-emitting light sources, wherein refraction of the source illumination beam by each beam spreading optical element substantially satisfies:

$$\frac{dy}{d\theta} = f(\theta)$$

wherein y is a radial distance along the illumination plane from the optical axis, dy is an arbitrarily small increment of the radial distance, $d\theta$ is the angular increment of the beam angle corresponding to dy, and $f(\theta)$ is a function for the angular distribution of the light source, such that each beam spreading optical element adjusts the luminous intensity of the source illumination beam from the corresponding surface-emitting light source to provide a uniformized illumination beam to the illumination plane; and, c) an array of beam-divergence reducing lens elements, wherein each beam-divergence reducing lens element reduces the angular divergence of a corresponding uniformized illumination beam, providing an illumination having improved uniformity and reduced beam divergence thereby;

d) a liquid crystal light modulator for modulating the illumination beam having reduced beam divergence to provide an image-bearing beam; and, e) a viewing angle control film, spaced apart from the liquid crystal light modulator, for broadening the viewing angle of the image-bearing beam.

16. The lighting apparatus of claim 15 wherein the viewing angle control film is a diffuser having a haze value of 90% or less.

* * * * *